United States Patent
Permuy

[19]

[11] Patent Number: 5,973,461
[45] Date of Patent: Oct. 26, 1999

[54] METHOD AND DEVICE FOR STARTING AND SYNCHRONIZING A THREE-PHASE MOTOR

[75] Inventor: Alfred Permuy, Rueil-Malmaison, France

[73] Assignee: Valeo Electronique, Creteil, France

[21] Appl. No.: 08/936,990

[22] Filed: Sep. 25, 1997

[30]     Foreign Application Priority Data

Sep. 27, 1996 [FR] France ................................ 96 11794

[51] Int. Cl.$^6$ ............................................ H02P 1/18
[52] U.S. Cl. ............................................ 318/254
[58] Field of Search ........................... 318/254, 439, 318/138, 700–724

[56]         References Cited

U.S. PATENT DOCUMENTS

| | | | |
|---|---|---|---|
| 4,309,643 | 1/1982 | Akamatsu | 318/138 |
| 4,507,590 | 3/1985 | Miyazaki . | |
| 4,620,139 | 10/1986 | Egami et al. | 318/254 |
| 4,737,674 | 4/1988 | Miyao | 310/268 |
| 4,755,728 | 7/1988 | Ban | 318/254 |
| 4,814,676 | 3/1989 | Hout | 318/254 |
| 5,323,094 | 6/1994 | Kaneda et al. | 318/254 |
| 5,373,206 | 12/1994 | Lim . | |
| 5,432,414 | 7/1995 | Sakurai et al. . | |
| 5,539,293 | 7/1996 | Randall et al. . | |
| 5,767,639 | 6/1998 | Sakaguchi et al. | 318/254 |
| 5,796,233 | 8/1998 | Satake et al. | 318/705 |

FOREIGN PATENT DOCUMENTS

| | | |
|---|---|---|
| 0 713 286 | 5/1996 | European Pat. Off. . |
| 2 590 423 | 5/1987 | France . |
| 33 25 610 | 1/1984 | Germany . |
| 43 05 321 | 8/1993 | Germany . |
| 95/24071 | 9/1995 | WIPO . |

*Primary Examiner*—Jonathan Salata
*Attorney, Agent, or Firm*—Morgan & Finnegan, LLP

[57]             ABSTRACT

A three-phase synchronous electric motor, especially a motor of a motorized fan unit for a motor vehicle, includes a synchronizing device in which the energizing signal for the three phases of the motor is synchronized with the rotational position of the rotor. The energizing signals are synchronized with a single position signal representing the rotational position of the rotor, and, in order to start the motor, its three phases are supplied with three energizing signals out of phase one with another by $2\pi/3$; if the motor then fails to start, the energizing signals are phase shifted by $2\pi/3$.

7 Claims, 3 Drawing Sheets

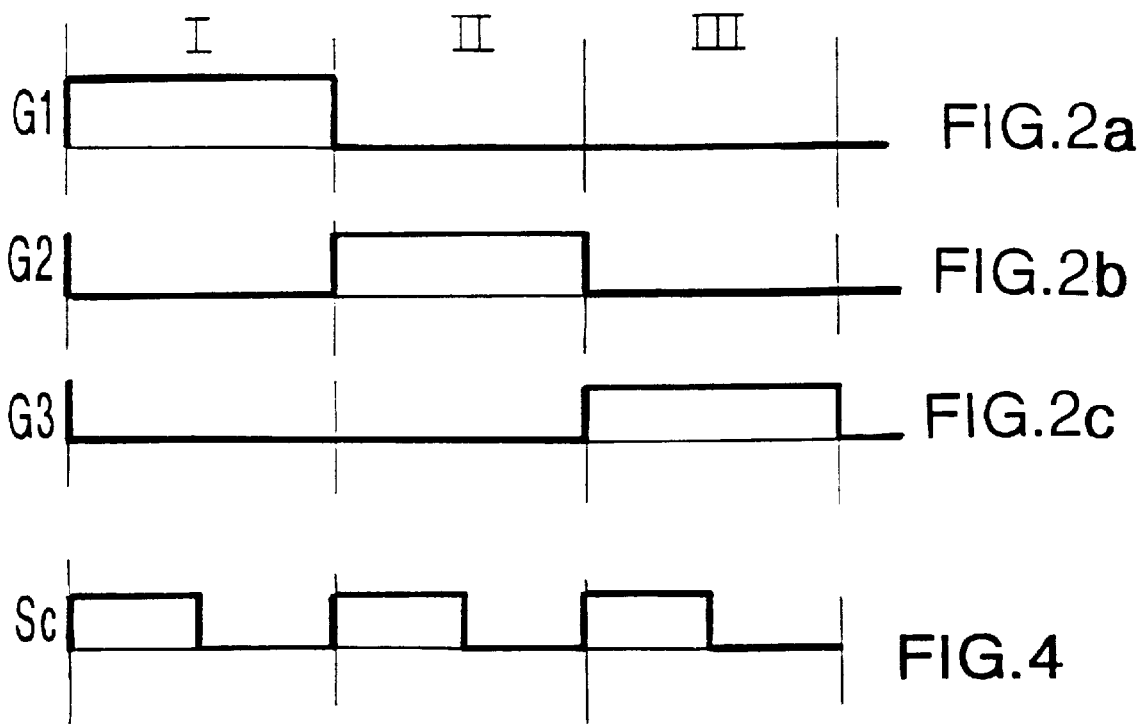
FIG. 2a
FIG. 2b
FIG. 2c
FIG. 4
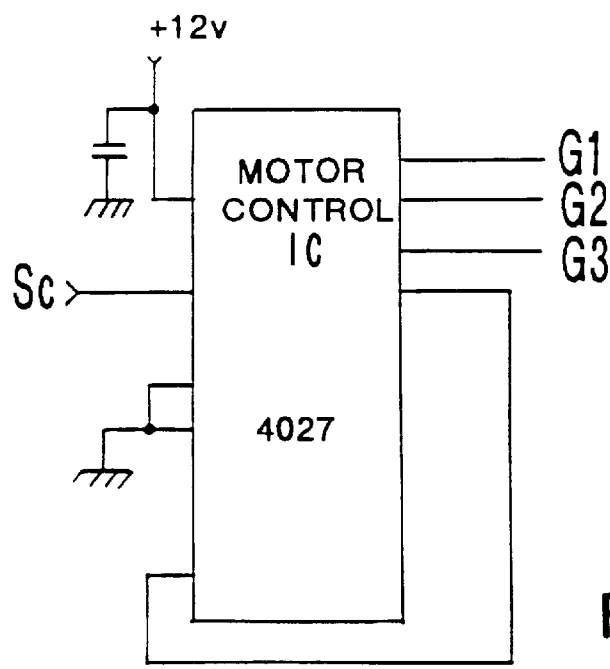
FIG. 5

METHOD AND DEVICE FOR STARTING AND SYNCHRONIZING A THREE-PHASE MOTOR

FIELD OF THE INVENTION

The present invention relates to three-phase synchronous motors, and to methods and devices for synchronizing the energization of such a motor. In particular, the invention is directed to three-phase motors of motorized fan units for motor vehicles.

BACKGROUND OF THE INVENTION

Conventionally, in order to synchronize the energization of the different phases of a three-phase motor with the rotation of the rotor of the motor, it is considered necessary to provide the same number of sensors as there are phases to be synchronized, the purpose of these sensors being to identify the instant rotational position of the rotor.

An example of this is shown in FIG. 1 of the accompanying drawings, which illustrates the simplest case of a three-phase synchronous motor, the rotor of which has only one pair of poles. In this case, the electrical angle is equal to the mechanical angle, that is to say one period in the control signals corresponds to one revolution of the rotor.

The windings B1, B2 and B3 of the stator of the motor are for example energized by three energized signals G1, G2 and G3, such as are shown in FIGS. 2a to 2c of the accompanying drawings. Three sensors C1 to C3 (FIG. 1) are usually provided for generating the three signals G1 to G3. The sensors follow the rotation of the rotor and detect the instant at which a transition must occur on the energising signals G1 to G3 respectively.

The sensors C1 to C3 are for example Hall effect cells which are spaced apart around the stator of the motor, the sensors being offset from each other by 120 degrees as shown in FIG. 1. The rotor also includes a magnetic sector S with an opening (or angle subtended at the centre) of 120 degrees. This sector cooperates with the three sensors C1 to C3.

By convention, it is decided that the winding directions of the windings are such that when a current flows through a winding, it tends to cause the north pole of the rotor to be aligned on its axis.

The signal which is given by each sensor Ci is the signal Gi which must be applied to the corresponding winding Bi. On starting, it is sufficient to energize whichever one of the windings is associated with the sensor which is in the high state, whereupon the motor will start.

DISCUSSION OF THE INVENTION

A main object of the invention is to provide a method of synchronizing a three-phase synchronous electric motor, which enables synchronization of the three phases to be achieved with only a single sensor.

According to the invention in a first aspect, a method of synchronizing the energisation of a three-phase synchronous electric motor, especially for a motor vehicle, is characterised in that the energizing signals for the different phases of the said motor are synchronized with a common signal which characterizes the rotational position of the rotor of the said motor, in that, in order to start the said motor, the three phases of the motor are energized by three energizing signals each of which is out of phase, by $2\pi/3$ from the next, and in that, if the motor remains stopped, the energization of the different phases of the motor is changed so that the latter are energized with the same signals phase-shifted by $2\pi/3$.

According to the invention in a second aspect, a synchronizing device for the energisation of a three-phase motor is characterized in that it includes means for synchronizing the energizing signals for the different phases of said motor with a common output signal from a sensor characterizing the rotation of the rotor, together with further means adapted so as, on starting of the motor, to energize the three phases of the motor with three energizing signals, each of which is out of phase by $2\pi/3$ from the next, the said further means being further adapted so as, if the motor remains stopped, to change the energization of the different phases of the said motor so as to energise the latter with the same energizing signals phase-shifted by $2\pi/3$.

Also included within the scope of the invention are: the combination of a synchronizing device in accordance with the invention with an electric motor; and a motorized fan unit for a motor vehicle including such a combination.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIGS. 2a to 2c, also referred to above, show diagrammatically three energizing signals for supplying power to the three windings of the prior art motor in FIG. 1, or to the motor in FIG. 3.

FIG. 4 shows diagrammatically the output signal of the position sensor in the motor of FIG. 3.

FIG. 5 is a diagrammatic representation of a device for generating the energizing signals in FIGS. 2a to 2c, from the position signal of FIG. 4.

DESCRIPTION OF A PREFERRED EMBODIMENT OF THE INVENTION

Figure 1:
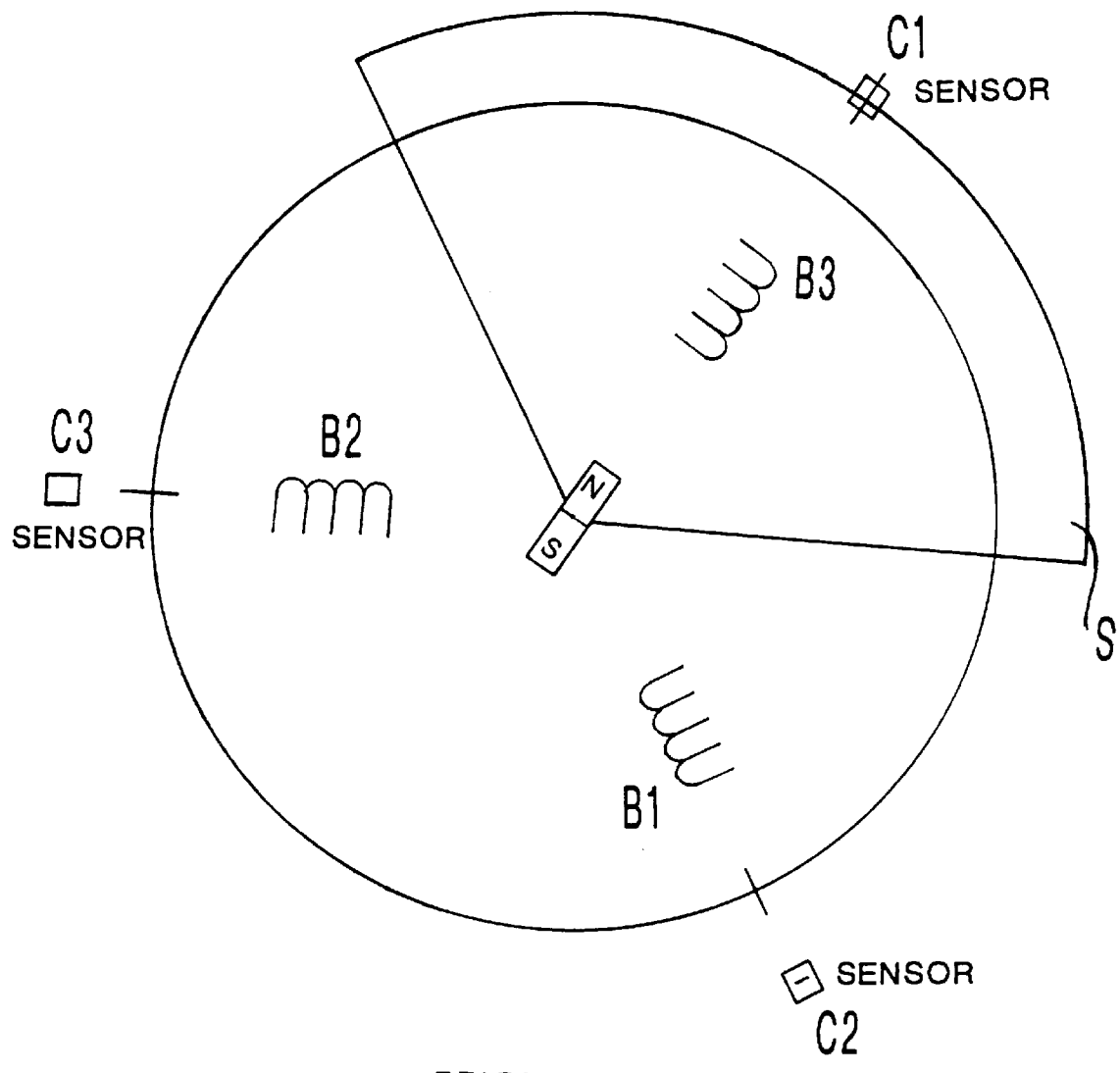
FIG. 1, already referred to above, is a diagrammatic representation of a three-phase synchronous motor in one form known in the prior art.
Figure 3:
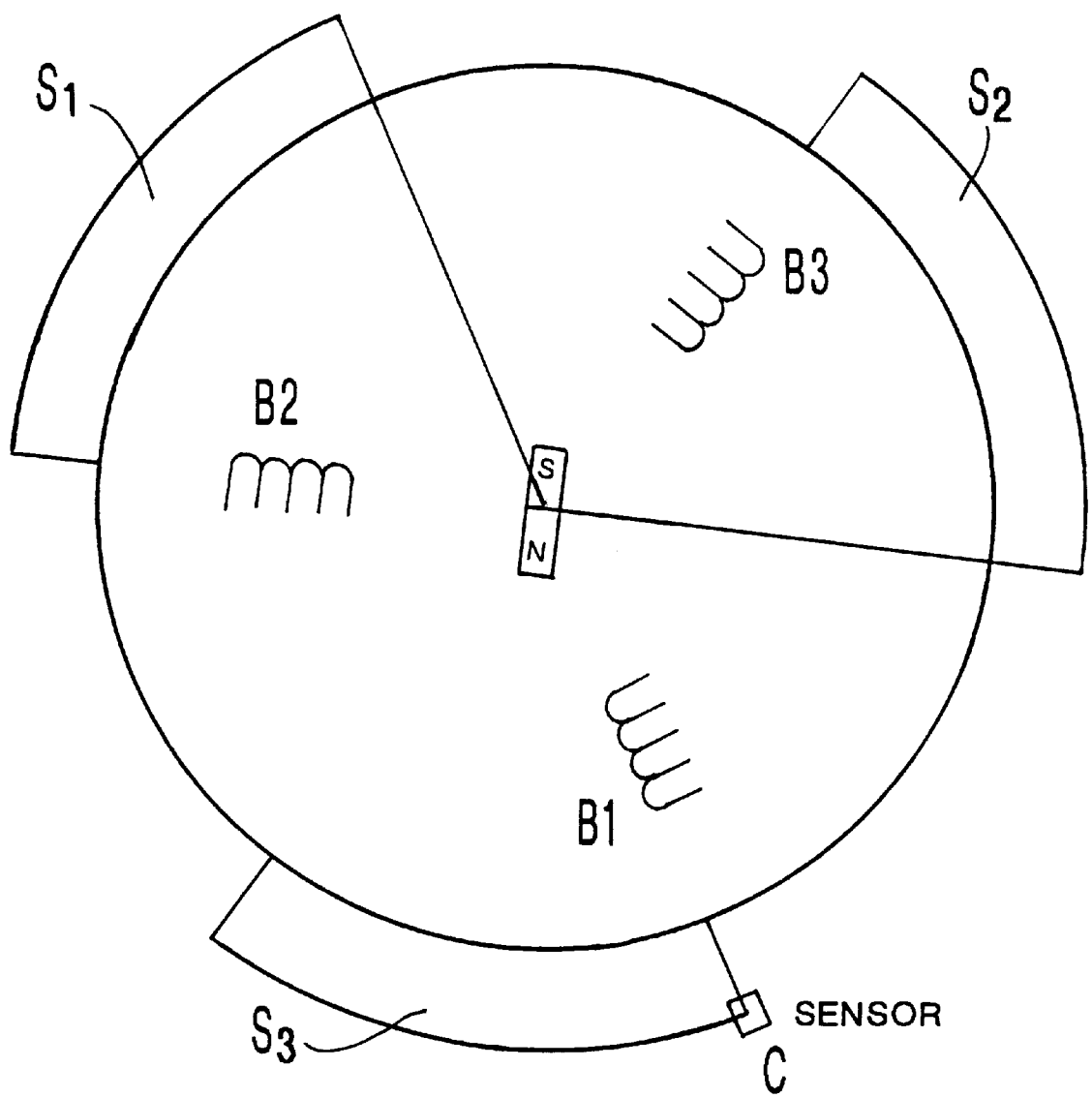
FIG. 3 shows diagrammatically a synchronous motor in one possible embodiment according to the present invention.

The three-phase synchronous motor shown in FIG. 3 is a motor with a rotor having one pair of poles and three stator windings B1, B2 and B3. The energizing signals for the windings B1 to B3 are generated in response to position signals from a single sensor C. This sensor is for example a Hall effect sensor which cooperates with a wheel fixed with respect to the rotor of the motor. This wheel comprises three magnetic sectors S1, S2 and S3, each with a 60 degree opening, that is to say each sector subtends at the axis of rotation of the wheel (and therefore of the rotor) an angle of 60 degrees. The three magnetic sectors S1 to S3 are spaced apart at equal intervals over the total circumference of the rotor.

The position signal Sc which is given by the sensor C is that which is illustrated in FIG. 4.

The energization, or power supply, to the windings provided by the energizing signals G1 to G3 must take place in a three-stage cycle in the following order: $B_{i0}$; $B_{i0+1}$; $B_{i0+2}$; $B_{i0}$. However, the problem which arises is due to the fact that it is not known which winding is the winding $B_{i0}$ which has to be energized first, given that the initial position of the rotor is not known beforehand.

In the method according to the invention, on starting, any one of the windings is energized, for example the winding B1. Depending on the initial position of the rotor, there are then three different possible situations. The first of these situations is that it is in effect necessary to commence with the winding B1, so that the control signal is in phase with the initial position of the rotor. The motor then starts.

In the second situation, it is the winding B2 which is energized first. In this case, the rotor will not move, the control signal being retarded with respect to the effective position of the rotor, since although the north pole of the rotor may become aligned on the axis of the winding B1, there is no transition from the positionsignal Sc from the sensor.

In the third possible situation, it is the winding B3 which is energized first. In this case, the rotor moves backwards so that the north pole aligns itself on the axis of the winding B1, which produces a transition from the sensor signal Sc and initiates the next step, that is to say the energization of the winding B2. Here, the control signal is advanced with respect to the effective position of the rotor, but the motor then starts even so.

Reference is now made to FIG. 5, which shows diagrammatically a circuit which enables the energizing signals Gi to be generated from the position signal Sc given by the sensor C. This circuit comprises, in this example, an integrated circuit of the type CD 4017 BE, which receives the sensor signal SC as an input signal. This circuit operates a three-way frequency divider.

On each rising front of the sensor signal Sc, the three output signals from the integrated circuit, which consist of the signals G1 to G3 respectively, pass successively to 1. The integrated circuit also has a fourth output, connected to a zeroing feedback input of the integrated circuit, which causes the 1 logic signal to be redistributed to the first output (i.e. signal G1).

The invention has of course just been described in the simple case of a motor with a single pair of poles, but it may be generalized to any motor having n pairs of poles, where n is two or more. To this end, the wheel which is used may for example have n times more sectors, the angle or opening (as explained above) of each sector being 60°/n for generating n times more transitions of the sensor signal Sc. Thus if there are two pairs of poles, the angle of each sector is 30 degrees. Thus with n pairs of poles instead of one pair, the phases I, II and III in the signals of FIGS. 2a to 2c no longer correspond only to $n^{-1}$ times a complete revolution of the rotor (i.e. to one half a turn), the electrical angle being different from the mechanical angle. In addition, the method of synchronizing is unchanged.

In the general case, it is found in this connection that, when the three-phase motor is energized with three input signals out of phase with each other by $2\pi/3$, the motor starts in two cases out of three, and remains stopped in the third case. If it remains stopped, it is sufficient to phase-shift by $2\pi/3$ the excitation (energization) of the different phases. The motor will then necessarily start.

Equally, the energizing signals may be overlapping signals in order to make the control of the motor more flexible and to give a more regular torque. The signals G1, G2 and G3 shown in FIGS. 2a to 2c, with which the foregoing description deals, have been retained here, so as to assist understanding of the invention.

In addition, sensors of types other than Hall effect sensors may be used, for example coding wheels, or, again, means which include means for generating a light beam, such as light emitting diodes or a lamp with a photoelectric cell.

The invention is of particular advantage when applied to electronically controlled motors, for example those of motorized fan units for motor vehicles.

The synchronizing device for the energisation of a three-phase motor which is proposed by the present invention includes processing means for synchronizing the energizing signals for the different phases of the motor with a common output signal from a sensor, in order to characterize the rotational position of the rotor, together with means adapted so that on starting of the motor, these latter means energize the three phases of the motor with three energizing signals, each of which is out of phase from the next by $2\pi/3$; the processing means being in addition adapted so as, if the motor remains stopped, to change the energization of the different phases of the motor in order to energise the latter with the same signals, phase-shifted by $2\pi/3$.

The energizing signals are pulsed signals, the common signal with which these signals are synchronized being a pulsed signal in which the various transitions initiate the transitions in the energizing signals.

What is claimed is:

1. A method of synchronizing the energization of a three-phase synchronous electric motor having a rotor, the method comprising the steps of:

generating a single position signal representing the instant rotational position of the rotor;

generating energizing signals for energizing the different phases of the motor;

synchronizing each of said energizing signals according to said single position signal;

supplying the energizing signals to the three phases of the motor respectively, with each energizing signal being out of phase from the next by $2\pi/3$; and, if the motor fails to start in response to supplying the energizing signals, then phase shifting said energizing signals by $2\pi/3$ and supplying the phase shifted energizing signals to the three phases of the motor, respectively, such that the phase shifted energizing signals as initially supplied to the respective three phases are phase shifted by about $2\pi/3$ relative to the energizing signals as initially supplied to the respective three phases.

2. A method according to claim 1, wherein the energizing signals and the position signal are pulsed signals, with the transitions in the pulsed position signal initiating transitions in the energizing signals.

3. A method according to claim 1, wherein said motor is a motor of a motorized fan unit for a motor vehicle.

4. A synchronizing device for the energization of a three-phase motor having a rotor, the synchronizing device comprising:

a sensor associated with the rotor for producing a sensor signal representing the instant rotational position of the rotor;

synchronizing means for synchronizing energizing signals according to said sensor signal; and means for starting the motor by supplying the three phases of the motor with three said energizing signals respectively, each energizing signal being out of phase with the next by $2\pi/3$, and for, in the event that the motor fails to start in response to supplying the three said energizing signals, phase shifting the energizing signals by $2\pi/3$ and supplying the phase shifted signals to the three phases of the motor, respectively, such that the phase shifted energizing signals as initially supplied to the respective three phases are phase shifted by about $2\pi/3$ relative to the energizing signals as initially supplied to the respective three phases.

5. A device according to claim 4, having a single said sensor.

6. A three-phase electric motor coupled to a synchronizing device according to claim 4.

7. A motorized fan unit for a motor vehicle, including a three-phase electric motor coupled to a synchronizing device according to claim 4.

* * * * *